(12) United States Patent
Tanaka et al.

(10) Patent No.: US 11,404,683 B2
(45) Date of Patent: Aug. 2, 2022

(54) ALL-SOLID-STATE LITHIUM BATTERY AND METHOD FOR MANUFACTURING SAME

(71) Applicant: NGK INSULATORS, LTD., Nagoya (JP)

(72) Inventors: Kei Tanaka, Nagoya (JP); Miyuki Kojima, Nagoya (JP); Keita Miyanishi, Nagoya (JP); Yosuke Sato, Nagoya (JP); Yuji Katsuda, Nagoya (JP); Yukihisa Takeuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 263 days.

(21) Appl. No.: 16/876,513

(22) Filed: May 18, 2020

(65) Prior Publication Data
US 2020/0280047 A1 Sep. 3, 2020

Related U.S. Application Data

(63) Continuation of application No. PCT/JP2018/043240, filed on Nov. 22, 2018.

(30) Foreign Application Priority Data

Dec. 12, 2017 (WO) .................. PCT/JP2017/044622

(51) Int. Cl.
*H01M 10/0525* (2010.01)
*H01M 10/0562* (2010.01)
(Continued)

(52) U.S. Cl.
CPC ........... *H01M 4/131* (2013.01); *H01M 4/043* (2013.01); *H01M 4/0426* (2013.01);
(Continued)

(58) Field of Classification Search
CPC .. H01M 4/131; H01M 4/0471; H01M 4/1391; H01M 4/485; H01M 4/525;
(Continued)

(56) References Cited

U.S. PATENT DOCUMENTS

| 2017/0025705 | A1 | 1/2017 | Miara et al. |
| 2017/0279155 | A1* | 9/2017 | Sun ...................... H01M 4/525 |
| 2018/0233744 | A1 | 8/2018 | Ohira et al. |

FOREIGN PATENT DOCUMENTS

| JP | 2005-353309 A1 | 12/2005 |
| JP | 2009-259696 A1 | 11/2009 |

(Continued)

OTHER PUBLICATIONS

Yutaro Li et al., "Flourine-Doped Antiperovskite Electrolyte for All-Solid-State Lithium-Ion Batteries", *Angew. Chem. Int. Ed.*, 2016, 55, pp. 9965-9968.

(Continued)

*Primary Examiner* — James Lee
(74) *Attorney, Agent, or Firm* — Burr & Brown, PLLC (57) ABSTRACT

There is provided an all-solid-state lithium battery including: a positive-electrode plate composed of a lithium complex oxide sintered body having a layered rock-salt structure; a solid electrolyte layer composed of a lithium-ion-conductive antiperovskite material; a negative-electrode plate containing Ti and permitting intercalation and deintercalation of lithium ions at 0.4 (vs. Li/Li$^+$) V or more; a positive-electrode current collecting layer provided on a face, remote from the solid electrolyte layer, of the positive-electrode plate; a negative-electrode current collecting layer provided on a face, remote from the solid electrolyte layer, of the negative-electrode plate; a positive-electrode covering metal membrane provided at an interface between the positive-electrode plate and the solid electrolyte layer; and a negative-electrode covering metal membrane provided at an interface between the negative-electrode plate and the solid electrolyte layer.

19 Claims, 3 Drawing Sheets

(51) Int. Cl.
    *H01M 4/131* (2010.01)
    *H01M 4/04* (2006.01)
    *H01M 4/1391* (2010.01)
    *H01M 4/485* (2010.01)
    *H01M 4/525* (2010.01)
    *H01M 4/62* (2006.01)
    *H01M 10/0585* (2010.01)

(52) U.S. Cl.
    CPC ....... *H01M 4/0471* (2013.01); *H01M 4/1391* (2013.01); *H01M 4/485* (2013.01); *H01M 4/525* (2013.01); *H01M 4/628* (2013.01); *H01M 10/0525* (2013.01); *H01M 10/0562* (2013.01); *H01M 10/0585* (2013.01); *H01M 2300/008* (2013.01)

(58) Field of Classification Search
    CPC ............. H01M 4/628; H01M 10/0525; H01M 10/0562; H01M 10/0585
    See application file for complete search history.

(56) References Cited

FOREIGN PATENT DOCUMENTS

| | | |
|---|---|---|
| JP | 2015-185337 A1 | 10/2015 |
| WO | 2012/112229 A2 | 8/2012 |
| WO | 2013/146454 A1 | 10/2013 |
| WO | 2014/150763 A1 | 9/2014 |
| WO | 2017/146088 A1 | 8/2017 |

OTHER PUBLICATIONS

International Search Report and Written Opinion (Application No. PCT/JP2018/043240) dated Feb. 26, 2019 (with English translation).

International Search Report and Written Opinion (Application No. PCT/JP2017/044622) dated Mar. 20, 2018.

* cited by examiner

Crystal Direction Map

| Direction | Min | Max | Total Fraction | Partition Fraction |
|---|---|---|---|---|
| <0001>||[001] | 0° | 30° | 0.437 | 0.887 |

FIG. 2B

ALL-SOLID-STATE LITHIUM BATTERY AND METHOD FOR MANUFACTURING SAME

CROSS-REFERENCE TO RELATED APPLICATIONS

This application is a continuation application of PCT/JP2018/043240 filed Nov. 22, 2018, which claims priority to International Application No. PCT/JP2017/044622 filed Dec. 12, 2017, the entire contents all of which are incorporated herein by reference.

BACKGROUND OF THE INVENTION

1. Field of the Invention

The present invention relates to an all-solid-state lithium battery and a method of manufacturing the all-solid-state lithium battery.

2. Description of the Related Art

Traditional batteries used in various fields, for example, portable devices, such as personal computers and mobile phones, include liquid electrolytes (electrolytic solutions) that contain lithium salt dissolved in flammable organic solvents and serve as media migrating ions. The batteries including such electrolytic solutions may cause, for example, leakage, ignition, and explosion of the electrolytic solutions. In order to solve such problems and ensure essential safety, all-solid-state lithium batteries have been developed that include solid electrolytes instead of liquid electrolytes. All the other components of the all-solid-state lithium batteries are also solid. The solid electrolytes of such all-solid-state lithium batteries have less risk of ignition of the electrolytes and can reduce leakage of electrolytes and degradation of the battery performance caused by corrosion.

Powder-dispersed positive electrodes are widely known as layers of positive-electrode active material for lithium batteries, and are usually produced by kneading and molding particles of lithium complex oxide (typically, lithium-transition metal oxide) and additives, such as binders or conductive agents. Such powder-dispersed positive electrodes contain a relatively large amount (e.g., about 10% by weight) of binder that does not contribute to the capacity of a battery, resulting in a low packing density of the positive-electrode active material, i.e., lithium complex oxide. Accordingly, the powder-dispersed positive electrode should be greatly improved from the viewpoint of the capacity and charge/discharge efficiency.

Some attempts have been made to improve the capacity and charge/discharge efficiency by positive electrodes or layers of positive-electrode active material composed of a lithium complex oxide sintered plate. In this case, since the positive electrode or the layer of positive-electrode active material contains no binder, high capacity and satisfactory charge/discharge efficiency can be expected due to a high packing density of lithium complex oxide. For example, Patent Document 1 (WO2017/146088) discloses a low-angle oriented positive-electrode plate of an all-solid-state lithium battery including a solid electrolyte. The positive-electrode plate includes multiple primary grains composed of lithium complex oxide, for example, lithium cobaltate ($LiCoO_2$). Crystal planes (003) of the primary grains are oriented by a low mean angle of more than 0° to 30° relative to a main face of the positive electrode plate. Such orientation can mitigate the stress generated at an interface between the positive-electrode plate and the solid electrolyte during charging/discharging cycles. In other words, the main face of the positive electrode plate has a low expansion-contraction rate to reduce the stress generated at the interface between the positive-electrode plate and the solid electrolyte layer. Defects in the solid electrolyte layer and detachment of the positive-electrode plate from the solid electrolyte layer can thereby be reduced.

Negative electrodes or negative-electrode active material layers are also known that are composed of lithium complex oxide sintered plates. For example, Patent Document 2 (JP2015-185337A) discloses an all-solid-state battery including a positive electrode, a negative electrode, and a solid electrolyte layer. The positive electrode or negative electrode is composed of a lithium titanate ($Li_4Ti_5O_{12}$) sintered body. The sintered body disclosed in Patent Document 2 is highly dense and has a relative density of 90% or more. The high relative density reflects the general comprehension that the positive and negative electrodes are preferably dense for enhanced energy densities of all-solid-state secondary batteries.

Antiperovskite materials have been proposed for highly lithium-ion-conductive solid electrolytes. For example, Patent Document 3 (WO2012/112229) discloses that $Li_3OCl$ and $Li_{(3-x)}M_{x/2}OA$ serve as solid electrolytes having superior lithium ion conductivity, where $0 \leq x \leq 0.8$; M represents at least one selected from the group consisting of Mg, Ca, Ba, and Sr; and A represents at least one selected from the group consisting of F, Cl, Br, and I. Non-Patent Document 1 (Yutao Li et al., "Fluorine-Doped Antiperovskite Electrolyte for All-Solid-State Lithium-Ion Batteries", Angew. Chem. Int. Ed. 2016, 55, 9965-9968) discloses that $Li_2OHX$ is preferred as a solid electrolyte for an all-solid-state secondary battery, where X represents Cl or Br. Non-Patent Document 1 also discloses that a compound produced by doping of $Li_2OHCl$ with fluorine and partial substitution of $F^-$ for $OH^-$ has electrochemical stability suitable for the all-solid-state secondary battery.

CITATION LIST

Patent Literatures

Patent Document 1: WO2017/146088
Patent Document 2: JP2015-185337A
Patent Document 3: WO2012/112229

Non-Patent Literature

Non-Patent Document 1: Yutao Li et al., "Fluorine-Doped Antiperovskite Electrolyte for All-Solid-State Lithium-Ion Batteries", Angew. Chem. Int. Ed. 2016, 55, 9965-9968

SUMMARY OF THE INVENTION

The lithium-ion-conductive antiperovskite materials disclosed in Patent Document 3 and Non-Patent Document 1 is melted at low temperature compared to other common lithium-ion-conductive materials. The present inventors had conceived that such a lithium-ion-conductive material melted between a positive-electrode sintered plate and a negative-electrode sintered plate could yield an interface between the positive-electrode sintered plate and the negative-electrode sintered plate without reaction of the positive-electrode sintered plate with the negative-electrode sintered plate, and that an all-solid-state lithium battery having a low interfacial resistance and high electric conductivity could be produced. Unfortunately, such an all-solid-state lithium battery actually produced by the present inventors has significantly reduced electric conductivity compared to the lithium-ion-conductive material itself, resulting in difficult charge of the battery.

The present inventors have discovered that by providing a solid electrolyte layer composed of a lithium-ion-conductive antiperovskite material between a positive-electrode plate composed of a lithium complex oxide sintered body and a predetermined negative-electrode plate containing Ti; and interposing metal membranes at an interface between the positive-electrode plate and the solid electrolyte layer and an interface between the negative-electrode plate and the solid electrolyte layer, it is possible to avoid a reduction in electric conductivity and thus provide an all-solid-state lithium battery that has significantly high electric conductivity and is chargeable without any trouble.

An object of the present invention is to provide an all-solid-state lithium battery that has significantly high electric conductivity and is chargeable without any trouble.

According to an aspect of the present invention, there is provided an all-solid-state lithium battery comprising:
   a positive-electrode plate composed of a lithium complex oxide sintered body having a layered rock-salt structure;
   a solid electrolyte layer composed of a lithium-ion-conductive antiperovskite material;
   a negative-electrode plate containing Ti and permitting intercalation and deintercalation of lithium ions at 0.4 V (vs. Li/Li$^4$) or more;
   a positive-electrode current collecting layer provided on a face, remote from the solid electrolyte layer, of the positive-electrode plate;
   a negative-electrode current collecting layer provided on a face, remote from the solid electrolyte layer, of the negative-electrode plate;
   a positive-electrode covering metal membrane provided at an interface between the positive-electrode plate and the solid electrolyte layer; and
   a negative-electrode covering metal membrane provided at an interface between the negative-electrode plate and the solid electrolyte layer.

According to another aspect of the present invention, there is provided a method of producing the all-solid-state lithium battery, comprising the steps of:
   placing synthetic powder of the lithium-ion-conductive antiperovskite material between the positive-electrode plate and the negative-electrode plate to form a stack, a face, adjacent to the powder, of the positive-electrode plate being covered with the positive-electrode covering metal membrane, a face, adjacent to the powder, of the negative-electrode plate being covered with the negative-electrode covering metal membrane;
   heating the stack to a temperature above the melting point of the lithium-ion-conductive material to melt the lithium-ion-conductive material; and
   spontaneously or forcibly cooling to solidify the melted lithium-ion-conductive material to form the solid electrolyte layer between the positive-electrode plate and the negative-electrode plate.

DESCRIPTION OF EMBODIMENT

All-Solid-State Lithium Battery

Figure 1:
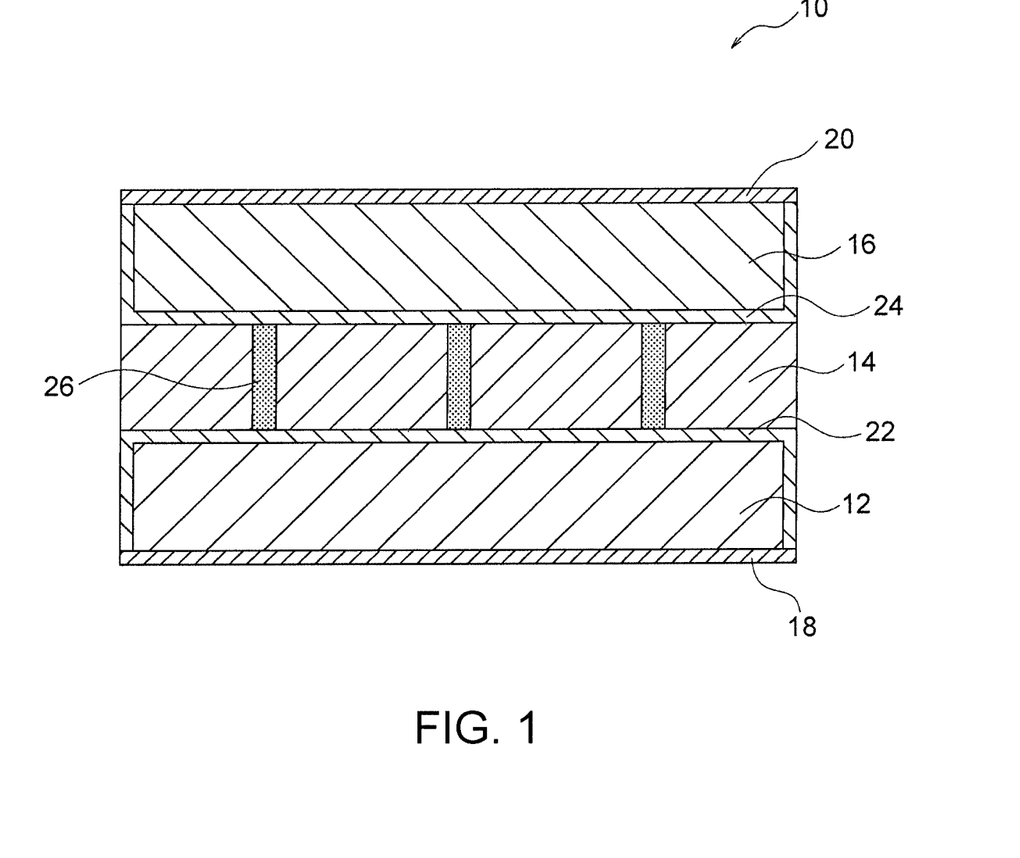
FIG. 1 is a schematic cross-sectional view of an exemplary secondary battery of the present invention.

FIG. 1 schematically illustrates an exemplary all-solid-state lithium battery of the present invention. An all-solid-state lithium battery 10 in FIG. 1 includes a positive-electrode plate 12, a solid electrolyte layer 14, a negative-electrode plate 16, a positive-electrode current collecting layer 18, a negative-electrode current collecting layer 20, a positive-electrode covering metal membrane 22, and a negative-electrode covering metal membrane 24. The positive-electrode plate 12 is composed of a lithium complex oxide sintered body having a layered rock-salt structure. The solid electrolyte layer 14 is composed of a lithium-ion-conductive antiperovskite material. The negative-electrode plate 16 is composed of a material containing Ti and permitting intercalation and deintercalation of lithium ions at 0.4 V (vs. Li/Li') or more. The positive-electrode current collecting layer 18 is provided on a face, remote from the solid electrolyte layer 14, of the positive-electrode plate 12. The negative-electrode current collecting layer 20 is provided on a face, remote from the solid electrolyte layer 14, of the negative-electrode plate 16. Whereas the positive-electrode covering metal membrane 22 covers an interface between the positive-electrode plate 12 and the solid electrolyte layer 14, the negative-electrode covering metal membrane 24 covers an interface between the negative-electrode plate 16 and the solid electrolyte layer 14. By providing the solid electrolyte layer 14 composed of a lithium-ion-conductive antiperovskite material between the positive-electrode plate 12 composed of a lithium complex oxide sintered body and the predetermined negative-electrode plate 16 containing Ti; and interposing the metal membranes at the interface between the positive-electrode plate 12 and the solid electrolyte layer 14 and the interface between the negative-electrode plate 16 and the solid electrolyte layer 14, it is possible to avoid a reduction in electric conductivity and thus provide a readily chargeable all-solid-state lithium battery having significantly high electric conductivity.

As described above, the present inventors had conceived that a lithium-ion-conductive antiperovskite material fused between a positive-electrode sintered plate and a negative-electrode sintered plate could yield an interface without reaction of the positive-electrode sintered plate with the negative-electrode sintered plate and that an all-solid-state lithium battery having a low interfacial resistance and high electric conductivity could be produced, in the early days. Unfortunately, such an all-solid-state lithium battery actually produced by the present inventors have significantly reduced electric conductivity compared to the lithium-ion-conductive material itself, resulting in difficult charge of the battery. Although the reason for this significantly reduced electric conductivity is unclear, it has unexpectedly proved that metal membranes, which are interposed at the interface between the positive-electrode plate 12 and the solid electrolyte layer 14 and the interface between the negative-electrode plate 16 and the solid electrolyte layer 14, can avoid a reduction in electric conductivity of the battery. Such effects can be achieved that are inherent in the case of the positive-electrode plate 12 and the negative-electrode plate 16 composed of lithium complex oxide sintered bodies, not in the case of, for example, the negative electrode composed of metallic lithium.

The positive-electrode plate 12 is composed of a lithium complex oxide sintered body having a layered rock-salt structure. The lithium complex oxide is an oxide represented as $Li_xMO_2$ (0.05<x<1.10, M includes at least one transition metal, typically, at least one selected from the group consisting of Co, Ni, Mn and Al). The lithium complex oxide has a layered rock-salt structure. The layered rock-salt structure refers to a crystalline structure in which lithium layers and transition metal layers other than lithium are alternately stacked with oxygen layers interposed therebetween. That is, the layered rock-salt structure is a crystalline structure in which transition metal ion layers and single lithium layers are alternately stacked with oxide ions therebetween (typically, an $\alpha$-$NaFeO_2$ structure: a cubic rock-salt structure in which transition metal and lithium are regularly disposed in the [111] axis direction). Examples of lithium complex oxides include $LixCoO_2$ (lithium cobaltate), $LixNiO_2$ (lithium nickelate), $LixMnO_2$ (lithium manganate), $LixNiMnO_2$ (lithium nickel manganate), $LixNiCoO_2$ (lithium nickel cobaltate), $LixCoNiMnO_2$ (lithium cobalt nickel manganate), $LixCoMnO_2$ (lithium cobalt manganate), $Li_2MnO_3$, and solid solutions thereof, and particularly preferably, $LixCoO_2$ (lithium cobaltate, typically $LiCoO_2$). The lithium complex oxide may contain at least one element selected from Mg, Al, Si, Ca, Ti, V, Cr, Fe, Cu, Zn, Ga, Ge, Sr, Y, Zr, Nb, Mo, Ag, Sn, Sb, Te, Ba, Bi, and W. Alternatively, lithium complex oxide having a different structure, for example, a material based on $LiMn_2O_4$ having a spinel structure or based on $LiMPO_4$ (M represents at least one selected from Fe, Co, Mn, and Ni) having an olivine structure may be preferably used.

It is preferred that the grains of the positive-electrode active material contained in the positive-electrode plate 12 are physically and electrically coupled with each other to enhance the energy density of the battery and the conductivities of electrons and ions.

Thus, the positive-electrode plate 12 is preferably composed of a lithium complex oxide sintered body. Since the positive-electrode plate composed of a sintered body contains no binder, high capacity and satisfactory charge/discharge efficiency can be achieved due to a high packing density of the lithium complex oxide. The binder in a green sheet will eventually disappear or burn while the green sheet is fired into the positive-electrode plate.

Figure 2A:
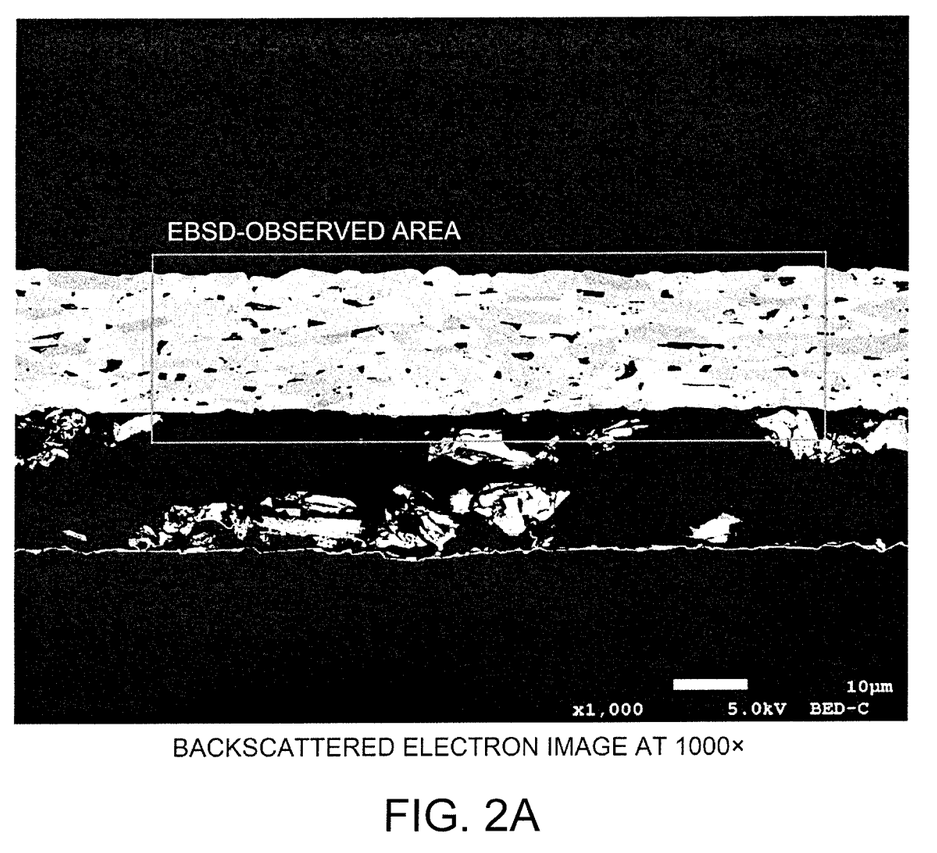
FIG. 2A is a scanning electron microscopic (SEM) image showing an exemplary cross-section of an oriented positive-electrode plate. The cross-section is perpendicular to a main face of the oriented positive-electrode plate.
Figure 2B:
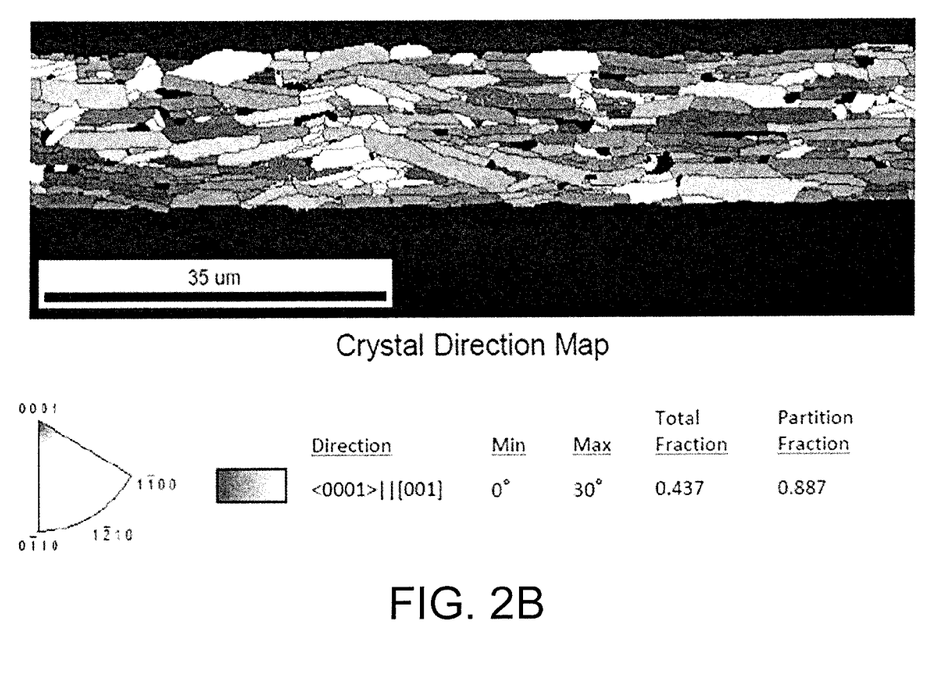
FIG. 2B is a cross-sectional electron backscatter diffraction (EBSD) image observed in an area, indicated by a rectangle in FIG. 2A, of the oriented positive-electrode plate.

The positive-electrode plate 12 includes multiple primary grains composed of lithium complex oxide. The primary grains are preferably oriented by a mean angle of more than 0° to 30° relative to a main face of the positive-electrode plate. Such an oriented positive-electrode plate can be produced by a process disclosed in Patent Document 1 (WO2017/146088). The orientation of each primary grain in the oriented positive-electrode plate can be analyzed by electron backscatter diffraction (EBSD). FIG. 2A shows a scanning electron microscopic (SEM) image of an exemplary cross-section of the oriented positive-electrode plate. The cross-section is perpendicular to a main face of the oriented positive-electrode plate. FIG. 2B illustrates a cross-sectional EBSD image observed in an area, indicated by a rectangle in FIG. 2A, of the oriented positive-electrode plate. In the EBSD image in FIG. 2B, irregularities in crystal orientation can be observed. In FIG. 2B, the orientation angle of each primary grain is represented by shading. Darker shading indicates a smaller orientation angle of the grain. The orientation angle refers to the tilt angle of the crystal plane (003) of the primary grain relative to a main face of the positive-electrode plate. In FIGS. 2A and 2B, dark spots on the oriented positive-electrode plate indicate pores.

As shown in FIGS. 2A and 2B, the averaged value of the orientation angles of the primary grains (hereinafter referred to as "mean orientation angle") is more than 0° to 30°. The mean orientation angle of the primary grains can be calculated by averaging of the orientation angles of approximately 30 primary grains. The primary grains are selected from the cross-sectional EBSD image, in FIG. 2B, of the oriented positive-electrode plate according to an approach, which will be described below. In view of increases in high-rate characteristics, the primary grains each have a mean orientation angle of preferably 30° or less, more preferably 25° or less. In view of high-rate characteristics, the primary grains each have a mean orientation angle of preferably 2° or more, more preferably 5° or more. After the magnification for observation of the image is determined such that the image includes approximately 30 primary grains, primary grains of which outer circumferences completely reside within a cross-sectional EBSD image of the positive-electrode plate are selected in the calculation of the mean orientation. It should be noted that primary grains each having a maximum Feret diameter of less than 0.5 μm are not counted.

In the electron backscatter diffraction (EBSD) analysis of the cross-section of the positive-electrode plate 12, the total area of the primary grains with crystal planes (003) each having an angle of more than 0° to 30° relative to the main face of the positive-electrode plate 12 is preferably 70% or more of the total area of all the primary grains included in the cross section. In other words, it is preferred that the total area of the primary grains each having an orientation angle of more than 0° to 30° (hereinafter referred to as "low-angle primary grains") is 70% or more of the total area of all the primary grains, from which the mean orientation angle is calculated, in the EBSD image shown in FIG. 2B. This configuration can increase the proportion of the primary grains having mutual adhesiveness, thereby high-rate characteristics can be further improved. In view of an increase in the high-rate characteristics, the total area of the low-angle primary grains is preferably above 70%, more preferably 80% or more, of the total area of the approximately 30 primary grains used in the calculation of the mean orientation angle. In addition, the total area of the low-angle primary grains having an orientation angle of 20° or less is more preferably 50% or more of the total area of the approximately 30 primary grains used in the calculation of the mean orientation angle. Furthermore, the total area of the low-angle primary grains having an orientation angle of 10° or less is more preferably 15% or more of the total area of the 30 primary grains used in the calculation of the mean orientation angle.

The positive-electrode plate 12 has a porosity of preferably 1 to 35%, more preferably 2 to 30%. A porosity in such a range can achieve desirable effects of stress release by pores and high capacity. The porosity of the positive-electrode plate 12 refers to the proportion of the volume of pores over the total volume of the positive-electrode plate 12, where the pores include open and closed pores. The porosity can be measured by analysis of a cross-sectional SEM image of the positive-electrode plate 12.

The positive-electrode plate 12 has a thickness of 20 μm or more, preferably 30 μm or more from the viewpoint of an increase in the active material capacity per unit area and an increase in energy density of the all-solid-state lithium battery 10. The thickness of the positive-electrode plate 12 may have any upper limit. The positive-electrode plate 12 has a thickness of preferably less than 500 μm, more preferably 300 μm or less, further preferably 250 μm or less, particularly preferably 200 μm or less from the viewpoint of restraint in deterioration of the battery properties due to repeated charge/discharge cycles (particularly, due to an increase in electric resistance). In addition, the positive-electrode plate 12 has dimensions of preferably 5 mm by 5 mm or more, more preferably 10 mm by 10 mm or more. In another expression, the positive electrode 12 has dimensions of preferably at least 25 mm$^2$, more preferably at least 100 mm$^2$ or more.

The solid electrolyte layer 14 is composed of a lithium-ion-conductive antiperovskite material. Preferred examples of the lithium-ion-conductive antiperovskite material include $Li_3OCl$, $Li_{(3-x)}M_{x/2}OA$ (where $0 \leq x \leq 0.8$; M represents at least one selected from the group consisting of Mg, Ca, Ba, and Sr; and A represents at least one selected from the group consisting of F, Cl, Br, and I), $Li_2(OH)_{1-a}F_aCl$ (where $0 \leq a \leq 0.3$), $Li_2OHX$ (where X represents Cl and/or Br), and any combination thereof. A more preferred example of the lithium-ion-conductive antiperovskite material is $Li_2(OH)_{1-a}F_aCl$. These materials have an advantage of high ion conductivity. These materials have low melting points and can be melted at 200 to 600° C., which will be described below. Hence, the solid electrolyte layer 14 is preferably a melt-solidified material composed of $Li_3OCl$, $Li_{(3-x)}M_{x/2}OA$, $Li_2(OH)_{1-a}F_aCl$, and/or $Li_2OHX$, more preferably a melt-solidified material composed of $Li_2(OH)_{1-a}F_aCl$. The solid electrolyte layer 14 may be produced by any technique. Examples of such techniques for production of the solid electrolyte layer 14 include processes involving heating a raw material to high temperature for reaction and then solidifying the raw material, gas phase processes, such as sputtering, chemical vapor deposition (CVD), and pulsed laser deposition (PLD), liquid phase processes, such as screen printing and spin coating, powder compaction processes, processes involving heating a raw material above its melting point and then solidifying the raw material, and processes involving compacting powder while heating the powder above its melting point and then solidifying the powder.

The solid electrolyte layer 14 may have any dimensions. The solid electrolyte layer 14 has a thickness of preferably 0.001 mm to 1.0 mm (1 to 1000 μm), more preferably 0.001 mm to 0.1 mm, further preferably 0.002 to 0.05 mm, from the viewpoint of charging/discharging rate characteristics and mechanical strength. The thickness of the solid electrolyte layer 14 may be controlled by the process for formation of the solid electrolyte layer 14. The thickness of the solid electrolyte layer 14 may be controlled by spacers 26 illustrated in FIG. 1 in the case of the process involving compacting powder while heating the powder above its melting point and then solidifying the powder. In other words, the all-solid-state lithium battery 10 of the present invention may further include the spacers 26 that are disposed between the positive-electrode plate 12 and the negative-electrode plate 16 to define the thickness of the solid electrolyte layer 14. In view of heat resistance, each spacer 26 is preferably composed of a ceramic, for example, $Al_2O_3$, MgO, or $ZrO_2$. Alternatively, the spacer 26 may be a commercially-available ceramic ball. The spacer 26 preferably has a resistivity of $1 \times 10^5$ Ω·cm or more.

The negative-electrode plate 16 can intercalate and deintercalate lithium ions at 0.4 V (vs. Li/Li$^+$) or more and contains Ti. A preferred negative-electrode active material satisfying such conditions is an oxide containing at least Ti. Preferred examples of such a negative-electrode active material include lithium titanate $Li_4Ti_5O_{12}$ (hereinafter referred to as "LTO"), niobium titanium complex oxide $Nb_2TiO_7$, and titanium oxide $TiO_2$. More preferred examples of the negative-electrode active material include LTO and $Nb_2TiO_7$. A further preferred example of the negative-electrode active material is LTO. Typical LTO is known to have a spinel structure. Alternatively, LTO may have a different structure during the charging/discharging cycles of the battery. For example, LTO may have two phases consisting of $Li_4Ti_5O_{12}$ having a spinel structure and $Li_7Ti_5O_{12}$ having a rock-salt structure during the charging/discharging cycles. The reaction continues between the two phases. Thus, LTO may have any structure other than the spinel structure.

It is preferred that multiple grains composed of a negative-electrode active material and contained in the negative-electrode plate 16 are physically and electrically coupled with each other to enhance the energy density of the battery and the conductivities of electrons and ions. Thus, the negative-electrode plate 16 is preferably composed of a sintered body containing, for example, LTO or $Nb_2TiO_7$. Since the negative-electrode plate composed of a sintered body contains no binder, high capacity and satisfactory charge/discharge efficiency can be achieved due to a high packing density of the negative-electrode active material, for example, LTO or $Nb_2TiO_7$. The binder in the green sheet will eventually disappear or burn while the green sheet is fired into the negative-electrode plate. The negative-electrode plate composed of a LTO sintered body can be produced by a process disclosed in Patent Document 2 (JP2015-185337A).

The negative-electrode plate 16 preferably includes pores. The pores included in the negative-electrode plate 16 appropriately or uniformly release the stress occurring by expansion and contraction of the crystalline lattice accompanying the intercalation and deintercalation of carrier ions (for example, lithium ions) during the charge/discharge cycles. In this mechanism, the grain boundary cracking during repetition of charge/discharge cycles is effectively restrained.

The negative-electrode plate 16 has a porosity of preferably 2 to 40%, more preferably 3 to 35%, further preferably 5 to 30%. A porosity in such a range can achieve desirable stress relaxation effects by pores and high capacity. The porosity of the negative-electrode plate 16 refers to the fraction of the volume of pores to the total volume of the negative-electrode plate 16, where the pores include open and closed pores. The porosity can be measured by analysis of a cross-sectional SEM image of the negative-electrode plate 16.

The negative-electrode plate 16 has a thickness of preferably 10 μm or more, more preferably 25 μm or more, further preferably 30 μm or more, particularly preferably 40 μm or more, mostly preferably 50 μm or more from the viewpoint of an increase in the active material capacity per unit area and an increase in energy density of the all-solid-state lithium battery 10. The thickness of the negative-electrode plate 16 may have any upper limit. The negative-electrode plate 16 has a thickness of preferably 500 μm or less, more preferably 300 μm or less, further preferably 250 μm or less to reduce the deterioration of the battery properties accompanied by repeated charge/discharge cycles (particularly, due to an increase in electric resistance). In addition, the negative-electrode plate 16 has dimensions of preferably 5 mm by 5 mm or more, more preferably 10 mm by 10 mm or more. In another expression, the negative-electrode plate 16 has dimensions of preferably at least 25 mm², more preferably at least 100 mm².

The positive-electrode current collecting layer 18 is provided on a face, remote from the solid electrolyte layer 14, of the positive-electrode plate 12. The negative-electrode current collecting layer 20 is provided on another face, remote from the solid electrolyte layer 14, of the negative-electrode plate 16. Examples of materials of the positive-electrode current collecting layer 18 and the negative-electrode current collecting layer 20 include platinum (Pt), alloys of platinum (Pt) and palladium (Pd), gold (Au), silver (Ag), aluminum (Al), copper (Cu), and ITO (a membrane of indium tin oxide). The positive-electrode current collecting layer 18 and the negative-electrode current collecting layer 20 may have any thickness.

The positive-electrode covering metal membrane 22 covers the interface between the positive-electrode plate 12 and the solid electrolyte layer 14. The negative-electrode covering metal membrane 24 covers the interface between the negative-electrode plate 16 and the solid electrolyte layer 14. Each of the positive-electrode covering metal membrane 22 and the negative-electrode covering metal membrane 24 is preferably composed of a metal that can be alloyed with lithium. The metal that can be alloyed with lithium preferably contains at least one selected from the group consisting of aluminum (Al), silicon (Si), zinc (Zn), gallium (Ga), germanium (Ge), silver (Ag), gold (Au), platinum (Pt), cadmium (Cd), indium (In), tin (Sn), antimony (Sb), lead (Pb), and bismuth (Bi), more preferably at least one selected from the group consisting of gold (Au), indium (In), Si (silicon), tin (Sn), zinc (Zn), and aluminum (Al). For example, a preferred metal that can be alloyed with lithium contains at least one selected from the group consisting of gold (Au) and indium (In). A more preferred metal is Au. The metal that can be alloyed with lithium may be composed of at least two elements, for example, $Mg_2Si$ and $Mg_2Sn$. The positive-electrode covering metal membrane 22 and the negative-electrode covering metal membrane 24 may be produced by any known process, for example, aerosol deposition (AD), pulsed laser deposition (PLD), sputtering, and evaporation. Sputtering is particularly preferred.

The positive-electrode covering metal membrane 22 and the negative-electrode covering metal membrane 24 each have a thickness of preferably 10 to 5000 Å, more preferably 50 to 2500 Å, further preferably 100 to 2000 Å.

As illustrated in FIG. 1, the positive-electrode covering metal membrane 22 may extend from the interface between the positive-electrode plate 12 and the solid electrolyte layer 14 and continuously cover end faces of the positive-electrode plate 12. As illustrated in FIG. 1, the negative-electrode covering metal membrane 24 may extend from the interface between the negative-electrode plate 16 and the solid electrolyte layer 14 and continuously cover end faces of the negative-electrode plate. Only one of the positive-electrode covering metal membrane 22 and the negative-electrode covering metal membrane 24 may cover the end faces of the positive-electrode plate 12 or the negative-electrode plate 16. Such a configuration can still improve charge/discharge performance to some extent.

Although being chargable or dischargable at room temperature, the all-solid-state lithium battery of the present invention is preferably charged or discharged at 100° C. or more. A temperature of 100° C. or more can achieve rapid charge/discharge at a high cycle capacity retention rate. In other words, a temperature of 100° C. or more enables the all-solid-state lithium battery 1 to rapidly charge or discharge. That is, the all-solid-state lithium battery can run stably at a high rate at this temperature. Repeated charge/discharge can retain high capacity. In other words, a high cycle capacity retention rate can be achieved. The operational temperature of the all-solid-state lithium battery during the charge/discharge cycles is preferably 100° C. or more, more preferably 100 to 300° C., further preferably 100 to 200° C., particularly preferably 100 to 150° C. Examples of a heating means achieving such an operational temperature include various heaters and exothermic devices. Preferred examples of the heating means are electroconductive ceramic heaters. In other words, the all-solid-state lithium battery of this embodiment is preferably provided as a secondary battery system including a heating means.

Production Process

It is preferred to produce the aforementioned all-solid-state lithium battery of the present invention by a process involving the steps of (a) placing a lithium-ion-conductive powdered material between a positive-electrode plate and a negative-electrode plate, (b) melting the lithium-ion-conductive material, and (c) spontaneously or forcibly cooling the melted lithium-ion-conductive material to solidify the material. The steps will now be described. Details and preferred embodiments of the positive-electrode plate 12, the solid electrolyte layer 14, the negative-electrode plate 16, the positive-electrode current collecting layer 18, the negative-electrode current collecting layer 20, the positive-electrode covering metal membrane 22, and the negative-electrode covering metal membrane 24 have been described above; hence, redundant description will be omitted.

(a) Placing Lithium-Ion-Conductive Powdered Material Between Positive-Electrode Plate and Negative-Electrode Plate Synthetic powder of lithium-ion-conductive antiperovskite material is placed between the positive-electrode plate 12 and the negative-electrode plate 16 to form a stack, where a face, adjacent to the powder, of the positive-electrode plate 12 is covered with the positive-electrode covering metal membrane 22 and a face, adjacent to the powder, of the negative-electrode plate 16 is covered with the negative-electrode covering metal membrane 24. The positive-electrode covering metal membrane 22 and the negative-electrode covering metal membrane 24 are preferably formed by sputtering for ease of control of the thicknesses of the membranes. Before the lithium-ion-conductive material is placed between the positive-electrode plate 12 and the negative-electrode plate 16, the positive-electrode plate 12 may be covered with the positive-electrode current collecting layer 18 and the negative-electrode plate 16 may be covered with the negative-electrode current collecting layer 20.

As described above, the all-solid-state lithium battery 10 may include spacers 26 disposed between the positive-electrode plate 12 and the negative-electrode plate 16 to define the thickness of the solid electrolyte layer 14. In this case, it is preferred to place the synthetic powder of the lithium-ion-conductive material and the spacers 26 together between the positive-electrode plate 12 and the negative-electrode plate 16.

(b) Melting Lithium-Ion-Conductive Material

The stack produced in Step (1) was heated to a temperature above the melting point of the lithium-ion-conductive material. The lithium-ion-conductive material is thereby melted. The temperature for the heat treatment ranges from 200 to 600° C., preferably from 200 to 500° C., more preferably from 250 to 450° C. Such a temperature range is advantageous in that the lithium-ion-conductive material can be melted without melting, thermal decomposition, or reaction of the positive-electrode plate 12 and the negative-electrode plate and 16 that are composed of sintered bodies. Thus, the intrinsic functions of the solid electrolyte layer 14, the positive-electrode plate 12, and the negative-electrode plate 16 can be kept. The heat treatment may be carried out for any time range, preferably 5 to 60 minutes, more preferably 10 to 60 minutes. During the heat treatment, it is preferred to press the positive-electrode plate 12 toward the negative-electrode plate 16 or the negative-electrode plate 16 toward the positive-electrode plate 12. Press can be carried out by only weighting the positive-electrode plate 12 or the negative-electrode plate 16. In the case that the spacers 26 are disposed, the solid electrolyte layer 14 can be certainly formed into a predetermined thickness corresponding to the heights of the spacers 26.

(c) Solidification of Melted Lithium-Ion-Conductive Material

The melted lithium-ion-conductive material is spontaneously or forcibly cooled to be solidified. The solid electrolyte layer 14 is thereby formed between the positive-electrode plate 12 and the negative-electrode plate 16. In this way, the lithium-ion-conductive material is melted and then solidified to form the solid electrolyte layer 14. Satisfactory interfacial bonds can thereby be formed on the positive-electrode covering metal membrane 22 covering one face of the positive-electrode plate 12 and on the negative-electrode covering metal membrane 24 covering one face of the negative-electrode plate 16. The interfacial bonds substantially have no contactless sites on the positive-electrode covering metal membrane 22 and the negative-electrode covering metal membrane 24. The melted lithium-ion-conductive material may be spontaneously or forcibly cooled at any cooling rate. The melted lithium-ion-conductive material may be slowly cooled at the rate of 5° C./h or may be taken from the heat source and then rapidly cooled.

(d) Optional Process

In the case that the positive-electrode plate 12 is not covered with the positive-electrode current collecting layer 18 before the lithium-ion-conductive material is placed between the positive-electrode plate 12 and the negative-electrode plate 16, it is preferred to form the solid electrolyte layer 14 and cover a face, remote from the solid electrolyte layer 14, of the positive-electrode plate 12 with the positive-electrode current collecting layer 18. Similarly, in the case that the negative-electrode plate 16 is not covered with the negative-electrode current collecting layer 20 before the lithium-ion-conductive material is placed between the positive-electrode plate 12 and the negative-electrode plate 16, it is preferred to form a solid electrolyte layer 14 and then cover another face, remote from the solid electrolyte layer 14, of the negative-electrode plate 16 with the negative-electrode current collecting layer 20.

EXAMPLES

The present invention will be described in more detail by the following examples. In the examples, $LiCoO_2$ will be abbreviated as "LCO" and $Li_4Ti_5O_{12}$ as "LTO".

Examples 1 to 3

(1) Production of Solid Electrolyte Powder

LiOH (purity≥98.0%), LiCl (purity≥99.9%), and LiF (purity≥99.9%) were provided as raw materials. These raw materials were commercially available. The raw materials were weighed in a glove box under an Ar atmosphere having a dew point lower than −50° C. such that the molar ratio LiOH:LiCl:LiF was 0.9:1.0:0.1. The raw materials were then lightly mixed with a mortar. The resultant powder was placed in a crucible composed of alumina (purity=99.7%). The crucible and a stirring rod were placed into a quartz tube, which was then sealed at its flange. The quartz tube was placed in a tubular furnace. Heat treatment was carried out for 30 minutes at 350° C., where gaseous Ar having a dew point lower than −50° C. was introduced from an inlet in the flange and discharged from an outlet in the flange while the mixed powder was stirred with the stirring rod. The quartz tube was retrieved and cooled. The inlet and outlet in the flange were then closed. The quartz tube was moved into the glove box under the Ar atmosphere having the dew point lower than −50° C. The flange of quartz tube was opened, from which the crucible was retrieved. The synthetic substance was taken from the crucible and pulverized with the mortar, resulting in a $Li_2(OH)_{0.9}F_{0.1}Cl$ solid electrolyte powder.

(2) Production of Positive-Electrode Plate (2a) Production of LCD Template Particles $Co_3O_4$ raw material powder (volume-based D50 particle diameter: 0.8 μm, available from Seido Chemical Industry Co., Ltd.) and $Li_2CO_3$ raw material powder (volume-based D50 particle diameter: 2.5 μm, available from Honjo Chemical Corporation) were mixed and fired for five hours at 800 to 900° C., resulting in synthetic $LiCoO_2$ raw material powder. The temperature for the heat treatment and the ratio of Li to Co were adjusted such that the LCO raw material powder had a volume-based D50 particle diameter of 3.0 μm. The resultant LCO powder was pulverized with a pot mill, resulting in platy LCO particles (LCO template particles). The time for pulverization of the LCO powder was adjusted such that the LCO template particles had a volume-based D50 particle diameter of 0.6 μm. The LCO template particles had an aspect ratio of 5. The aspect ratio of the LCO template particles was measured by SEM observation of particles.

(2b) Production of $Co_3O_4$ Matrix Particles

Matrix particles were produced from $Co_3O_4$ raw material powder (available from Seido Chemical Industry Co., Ltd). The matrix particles had a volume-based D50 particle diameter of 0.3 μm.

(2c) Production of Green Sheet

The LCO template particles and $Co_3O_4$ matrix particles were mixed. The ratio by weight of the LCO template particles to the $Co_3O_4$ matrix particles was determined to 50:50. The resultant powder mixture (100 parts by weight), a dispersive medium (toluene:2-propanol=1:1) (100 parts by weight), a binder (polyvinyl butyral: Product No. BM-2, available from Sekisui Chemical Co., Ltd.) (10 parts by weight), a plasticizer (di-2-ethylhexyl phthalate (DOP), available from Kurogane Kasei Co., Ltd.) (4 parts by weight), and a dispersant (product name: RHEODOL SP-030, available from Kao Corporation) (2 parts by weight) were mixed. The mixture was defoamed by stirring under reduced pressure to prepare a slurry with a viscosity of 400010000 cP. The viscosity was measured with an LVT viscometer available from Brookfield. The slurry was molded into a green sheet on a PET film with a doctor blade process at a molding rate of 100 m/h such that the dried green sheet had a thickness of 40 μm.

(2d) Production of $Li_2CO_3$ Green Sheet (Lithium Sheet)

$Li_2CO_3$ raw material powder (having a volume-based particle diameter D50 of 2.5 μm, available from The Honjo Chemical Corporation) (100 parts by weight), a binder (poly(vinyl butyral): Product No. BM-2, available from Sekisui Chemical Co., Ltd.) (5 parts by weight), a plasticizer di-2-ethylhexyl phthalate (DOP), available from Kurogane Kasei Co., Ltd.) (2 parts by weight), and a dispersant (RHEODOL SP-030, available from Kao Corporation) (2 parts by weight) were mixed. The mixture was defoamed by stirring under reduced pressure to prepare a $Li_2CO_3$ slurry with a viscosity of 4000 cP. The viscosity was measured with an LVT viscometer available from Brookfield. The $Li_2CO_3$ slurry was molded into a $Li_2CO_3$ green sheet on a PET film by a doctor blade process. The dried thickness of the $Li_2CO_3$ green sheet was controlled such that the Li/Co molar ratio of the Li content in the $Li_2CO_3$ green sheet to the Co content in the $LiCoO_2$ green sheet had a predetermined value.

(2e) Production of LCO Sintered Plate

The green sheet was detached from the PET film and placed on a zirconia setter. The green sheet was subjected to a first firing process for five hours at 900° C., resulting in a $Co_3O_4$ sintered plate. The $Co_3O_4$ sintered plate was then placed between the synthetic lithium sheets such that the Li/Co ratio was 1.05. The $Co_3O_4$ sintered plate placed between the synthetic lithium sheets was then placed on the zirconia setter and subjected to a second firing process, resulting in a LCO sintered plate having a thickness of about 35 μm. In detail, the $Co_3O_4$ sintered plate was placed on the zirconia setter. The $Co_3O_4$ sintered plate on the zirconia setter was placed into an alumina sheath having dimensions of 90 mm by 90 mm and held for five hours in air at 800° C. The $Co_3O_4$ sintered plate was then placed between the lithium sheets and subjected to the second firing process for 20 hours at 900° C.

(2f) Evaluation of LCO Sintered Plate

The resultant LCO sintered plate was subjected to the following tests.

<Observation of Primary Grains in LCO Sintered Plate>

A scanning electron microscope (FE-SEM SU5000 available from Hitachi High-Technologies Corporation) equipped with an electron backscatter diffraction image system and an EBSD detector (Nordly Nano available from Oxford Instruments PLC) was used to capture an EBSD image of a cross-section perpendicular to a main face of the positive electrode. The orientation angles of the approximately 30 primary grains, which were selected from the EBSD image under the conditions described above, were averaged to give a mean orientation angle of 18° of the primary grains. The rate (%) of the total area of the primary grains with an orientation angle of more than 0° to 30° to the total area of the approximately 30 primary grains used in calculation of the mean orientation angle was calculated from the EBSD image. The proportion was 80%.

<Compactness of LCO Sintered Plate>

The LCO sintered plate was subjected to cross-section polishing (CP). A SEM image was captured from the cross-section of the LCO sintered plate at a magnification of 1000 folds. The captured SEM image was binarized. The rate of the area of the gaseous phase to the total area of the solid and gaseous phases, i.e., the porosity was calculated from the binarized image. The porosity was 2%.

(3) Production of Negative-Electrode Plate (3a) Production of LTO Green Sheet

LTO powder (a volume-based D50 particle diameter: 0.06 μm, available from Sigma-Aldrich Japan LLC.) (100 parts by weight), a dispersant (toluene:2-propanol=1:1) (100 parts by weight), a binder (poly(vinyl butyral): Product No. BM-2, available from SEKISUI CHEMICAL CO., LTD.) (20 parts by weight), a plasticizer (di(2-ethylhexyl)phthalate (DOP), available from Kurogane Kasei Co., Ltd.) (4 parts by weight), and a dispersant (Product Name: RHEODOL SP-030, available from Kao Corporation) (2 parts by weight) were mixed. The resultant negative-electrode raw material mixture was deformed by stirring under reduced pressure to prepare a LTO slurry with a viscosity of 4000 cP. The viscosity was measured with an LVT viscometer available from Brookfield. The slurry was molded into a LTO green sheet on a PET film by a doctor blade process. The resulting slurry was applied onto a PET film by a doctor blade process to form an LTO green sheet. The dried thickness of LTO green sheet was adjusted such that the fired thickness was 80 μm.

(3b) Firing of LTO Green Sheet

The resultant green sheet was cut into a 25 mm square with a box cutter and placed onto an embossed zirconia setter. The green sheet on the setter was placed into an alumina sheath and held for five hours at 500° C., then heated at a rate of 200° C./h and fired for five hours at 800° C. In this manner, a LTO sintered plate serving as a negative-electrode plate was produced. The produced LTO sintered plate had a porosity of 30%.

(4) Formation of Positive-Electrode Current Collecting Layer, Negative-Electrode Current Collecting Layer, Positive-Electrode Covering Metal Membrane, and Negative-Electrode Covering Metal Membrane The positive-electrode plate produced in Step (2) was shaped into a square of about 10 mm by 10 mm. An Au-sputtered membrane having a thickness of 1000 Å was formed as positive-electrode current collecting layer on one face of the positive electrode plate in a sputtering system (JFC-1500 available from JEOL Ltd.) to make a positive-electrode current collecting layer. Another Au-sputtered membrane having a thickness of 500 Å (Example 1), 1000 Å (Example 2), or 2000 Å (Example 3) was formed on the other face of the positive-electrode plate to make a positive-electrode covering metal membrane. Similarly, the negative-electrode plate was shaped into a square of about 10 mm by 10 mm. An Au-sputtered membrane having a thickness of 1000 Å was formed on one face of the negative-electrode plate to make a negative-electrode current collecting layer. Another Au-sputtered membrane having a thickness of 500 Å (Example 1), 1000 Å (Example 2), or 2000 Å (Example 3) was formed on the other face of the negative-electrode plate to make a negative-electrode covering metal membrane.

(5) Production of all-Solid-State Lithium Battery

An all-solid-state lithium battery was produced in the glove box under an Ar atmosphere having a dew point lower than −50° C. according to the following steps: Three $Al_2O_3$ blocks or spacers having dimensions of 1 mm by 1 mm and a thickness of 100 μm were placed at equal intervals on the negative-electrode covering metal membrane on the negative-electrode plate. Solid electrolyte powder (0.1 g) was spread over the entire negative-electrode plate. The positive-electrode plate was placed on the spread solid electrolyte powder such that a face of the positive-electrode covering metal membrane came into contact with the solid electrolyte powder. A weight was then placed on the positive-electrode plate. The resulting stack was placed into an electric furnace in a glove box and subjected to a heat treatment for 45 minutes at 400° C. to melt the solid electrolyte powder. The melted electrolyte was then cooled at a rate of 100° C./h to form a solid electrolyte layer. The thickness of the all-solid-state lithium battery produced in this manner was measured. The thickness of the solid electrolyte layer was calculated by subtracting the sum of the thicknesses of the positive-electrode current collecting layer, the positive-electrode plate, the positive-electrode covering metal membrane, the negative-electrode covering metal membrane, the negative-electrode plate, and the negative-electrode current collecting layer from the thickness of the all-solid-state lithium battery. The calculated thickness of the solid electrolyte layer was 100 μm.

(6) Production of Stainless Steel Cell Including Solid Electrolyte Single Body

A stainless steel cell was produced to measure the electric conductivity of the solid electrolyte itself. A stainless steel cell including a solid electrolyte layer having a thickness of 100 μm and held between stainless steel plates (SUS plates) was produced as in Step (5) except that stainless steel plates (SUS 316L) each having a thickness of 0.3 mm were used instead of the positive-electrode plate and the negative-electrode plate, and the positive-electrode covering metal membrane and the negative-electrode covering metal membrane, which were Au-sputtered membranes, were formed as in Step (4).

(7) Measurement of Electric Conductivity

The electric conductivities of the all-solid-state lithium battery produced in Step (5) and the stainless steel cell produced in Step (6) were measured at 25° C. Alternate-current impedance was measured with a potentio-galvanostat Solartron 1287A and a frequency response analyzer Solartron 1252A at a frequency ranging from 0.3 MHz to 0.1 Hz to determine the electric conductivity. In the measurement of the AC impedance, the positive-electrode current collecting layer and the negative-electrode current collecting layer of the all-solid-state lithium battery were connected to the respective terminals of the instrument, whereas the outer faces, remote from the solid electrolyte layer, of the stainless steel plates were connected to the respective terminals. The stainless steel cell had electric conductivity of $1\times10^{-6}$ S/cm. The all-solid-state lithium batteries according to Examples 1 to 3 each had electric conductivity of $1\times10^{-6}$ S/cm as shown in Table 1. These results demonstrate that the Au-sputtered membranes (covering metal membranes) interposed between the positive-electrode plate and the solid electrolyte layer and between the negative-electrode plate and the solid electrolyte layer enables production of an all-solid-state lithium battery that does not cause a significant reduction in electric conductivity.

(8) Charging Test

The all-solid-state lithium batteries of Examples 1 to 3 were each subjected to a charge test at 25° C. The all-solid-state lithium battery was charged at a constant current of 1 μA. Table 1 shows that the charge of all the all-solid-state lithium batteries successfully start without any trouble.

Example 4

An all-solid-state lithium battery was produced and evaluated as in Example 1 except that commercially-available zirconia balls (having a diameter 0.03 mm) as spacers were used instead of the $Al_2O_3$ blocks in Step (5) to form a solid electrolyte layer having a thickness of 30 μm.

Formation of Solid Electrolyte Layer

Solid electrolyte powder (1 g) produced in Step (1) of Example 1 was lightly mixed with zirconia balls (0.05 g) using a mortar. The resultant solid electrolyte powder (0.30 g) containing zirconia balls was spread over the entire negative-electrode covering metal membrane (500 Å thick) of the negative-electrode plate. The solid electrolyte layer was then formed using the positive-electrode plate covered with the positive-electrode covering metal membrane (500 Å thick) as in Step (5) of Example 1. The thickness of the resulting all-solid-state lithium battery was measured. The thickness of the solid electrolyte layer was calculated by subtracting the sum of the thicknesses of the positive-electrode current collecting layer, the positive-electrode plate, the positive-electrode covering metal membrane, the negative-electrode covering metal membrane, the negative-electrode plate, and the negative-electrode current collecting layer from the thickness of the all-solid-state lithium battery. The calculated thickness of the solid electrolytic layer was 30 μm. In other words, the solid electrolyte layer had a thickness corresponding to the diameter of the commercially-available zirconia balls.

The produced all-solid-state lithium battery had an electric conductivity of $1\times10^{-6}$ S/cm that is the same as that in Examples 1 to 3, as shown in Table 1. The all-solid-state lithium battery was charged at a constant current of 1 μA. Table 1 shows that the charge of the all-solid-state lithium battery successively start without any trouble.

Example 5 (Comparative Example)

An all-solid-state lithium battery was produced and evaluated as in Example 1 except that the positive-electrode covering metal membrane and the negative-electrode covering metal membrane were not formed in Step (5) (in other words, the Au-sputtered membranes were not formed at the interface between the positive-electrode plate and the solid electrolyte layer and the interface between the negative-electrode plate and the solid electrolyte layer). Table 1 shows that the battery have an electric conductivity on the order of $10^{-11}$ S/cm, which is significantly lower than those in Examples 1 to 3. Although the battery was tried to be charged at a constant current of 1 μA, the voltage increased to inhibit the charge. Thus, the battery could not be charged. This was caused by low electric conductivity and high resistance of the battery leading to an increase in overvoltage. These results demonstrate that absence of membranes at the interface between the positive-electrode plate and the solid electrolyte layer and the interface between the negative-electrode plate and the solid electrolyte layer causes a significant reduction in electric conductivity of the battery compared to the stainless steel cell. The metal membranes provided at the interfaces can keep inherent electric conductivity of the solid electrolyte and enables charge of the battery to successfully start.

TABLE 1

| | Thickness of Positive-Electrode Covering Metal Membrane (Å) | Thickness of Negative-Electrode Covering Metal Membrane (Å) | Conductivity (S/cm) | Thickness of Solid Electrolyte Layer (μm) | Chargeability (at 1 μA) |
|---|---|---|---|---|---|
| Ex. 1 | 500 | 500 | $1\times10^{-6}$ | 100 | Chargeable |
| Ex. 2 | 1000 | 1000 | $1\times10^{-6}$ | 100 | Chargeable |

TABLE 1-continued

| | Thickness of Positive-Electrode Covering Metal Membrane (Å) | Thickness of Negative-Electrode Covering Metal Membrane (Å) | Conductivity (S/cm) | Thickness of Solid Electrolyte Layer (μm) | Chargeability (at 1 μA) |
|---|---|---|---|---|---|
| Ex. 3 | 2000 | 2000 | $1 \times 10^{-6}$ | 100 | Chargeable |
| Ex. 4 | 500 | 500 | $1 \times 10^{-6}$ | 30 | Chargeable |
| Ex. 5* | 0 | 0 | $5 \times 10^{-11}$ | 100 | Unchargeable |

*indicates Comparative Example.

What is claimed is:

1. An all-solid-state lithium battery comprising:
   a positive-electrode plate composed of a lithium complex oxide sintered body having a layered rock-salt structure;
   a solid electrolyte layer composed of a lithium-ion-conductive antiperovskite material;
   a negative-electrode plate containing Ti and permitting intercalation and deintercalation of lithium ions at 0.4 V (vs. Li/Li$^+$) or more;
   a positive-electrode current collecting layer provided on a face, remote from the solid electrolyte layer, of the positive-electrode plate;
   a negative-electrode current collecting layer provided on a face, remote from the solid electrolyte layer, of the negative-electrode plate;
   a positive-electrode covering metal membrane provided at an interface between the positive-electrode plate and the solid electrolyte layer; and
   a negative-electrode covering metal membrane provided at an interface between the negative-electrode plate and the solid electrolyte layer.

2. The all-solid-state lithium battery according to claim 1, wherein the positive-electrode covering metal membrane and the negative-electrode covering metal membrane each have a thickness of 10 to 5000 Å.

3. The all-solid-state lithium battery according to claim 1, wherein the positive-electrode covering metal membrane and the negative-electrode covering metal membrane are each composed of a metal alloyable with lithium.

4. The all-solid-state lithium battery according to claim 3, wherein the metal alloyable with lithium is Au.

5. The all-solid-state lithium battery according to claim 1, wherein the positive-electrode covering metal membrane extends from the interface between the positive-electrode plate and the solid electrolyte layer and continuously covers end faces of the positive-electrode plate.

6. The all-solid-state lithium battery according to claim 1, wherein the negative-electrode covering metal membrane extends from the interface between the negative-electrode plate and the solid electrolyte layer and continuously covers end faces of the negative-electrode plate.

7. The all-solid-state lithium battery according to claim 1, wherein the lithium-ion-conductive antiperovskite material is at least one selected from the group consisting of Li$_3$OCl, Li$_{(3-x)}$M$_{x/2}$OA (where 0≤x≤0.8; M represents at least one selected from the group consisting of Mg, Ca, Ba, and Sr; and A is at least one selected from the group consisting of F, Cl, Br, and I), Li$_2$(OH)$_{1-a}$F$_a$Cl (where 0≤a≤0.3), and Li$_2$OHX (where X represents Cl and/or Br).

8. The all-solid-state lithium battery according to claim 1, wherein the solid electrolyte layer has a thickness of 1 to 1000 μm.

9. The all-solid-state lithium battery according to claim 1, further comprising spacers disposed between the positive-electrode plate and the negative-electrode plate to define the thickness of the solid electrolyte layer.

10. The all-solid-state lithium battery according to claim 9, wherein the spacers each have a resistivity of $1 \times 10^5$ Ω·cm or more.

11. The all-solid-state lithium battery according to claim 9, wherein the spacers are each composed of a ceramic.

12. The all-solid-state lithium battery according to claim 1, wherein the positive-electrode plate has a thickness of 20 to 300 μm.

13. The all-solid-state lithium battery according to claim 1, wherein the lithium complex oxide having the layered rock-salt structure is lithium cobaltate.

14. The all-solid-state lithium battery according to claim 1, wherein the negative-electrode plate has a thickness of 10 to 300 μm.

15. The all-solid-state lithium battery according to claim 1, wherein the battery is charged or discharged at 100° C. or more.

16. A method of producing the all-solid-state lithium battery according to claim 1, comprising the steps of:
   placing synthetic powder of the lithium-ion-conductive antiperovskite material between the positive-electrode plate and the negative-electrode plate to form a stack, a face, adjacent to the powder, of the positive-electrode plate being covered with the positive-electrode covering metal membrane, a face, adjacent to the powder, of the negative-electrode plate being covered with the negative-electrode covering metal membrane;
   heating the stack to a temperature above the melting point of the lithium-ion-conductive material to melt the lithium-ion-conductive material; and
   spontaneously or forcibly cooling to solidify the melted lithium-ion-conductive material to form the solid electrolyte layer between the positive-electrode plate and the negative-electrode plate.

17. The method according to claim 16, wherein the positive-electrode plate is covered with the positive-electrode current collecting layer before the powder is placed between the positive-electrode plate and the negative-electrode plate, or otherwise the method further comprises the step of covering the face, remote from the solid electrolyte layer, of the positive-electrode plate with the positive-electrode current collecting layer after formation of the solid electrolyte layer, and
   wherein the negative-electrode plate is covered with the negative-electrode current collecting layer before the powder is placed between the positive-electrode plate and the negative-electrode plate, or otherwise the method further comprises the step of covering the face, remote from the solid electrolyte layer, of the negative-electrode plate with the negative-electrode current collecting layer after formation of the solid electrolyte layer.

18. The method according to claim 16, wherein the all-solid-state lithium battery comprises spacers disposed between the positive-electrode plate and the negative-electrode plate to define the thickness of the solid electrolyte layer, and wherein the synthetic powder of the lithium-ion-conductive material and the spacers are placed together between the positive-electrode plate and the negative-electrode plate.

19. The method according to claim 16, wherein the positive-electrode covering metal membrane and the negative-electrode covering metal membrane are each formed by sputtering.

* * * * *